United States Patent [19]

Werner

[11] 4,283,026

[45] Aug. 11, 1981

[54] MAGNETIC TAPE CASSETTE

[75] Inventor: Franz Werner, Vienna, Austria

[73] Assignee: U.S. Philips Corporation, New York, N.Y.

[21] Appl. No.: 64,921

[22] Filed: Aug. 8, 1979

[30] Foreign Application Priority Data

Aug. 14, 1978 [AT] Austria .................. 5919/78

[51] Int. Cl.³ .................. B65H 75/28; G03B 1/04; G11B 15/32

[52] U.S. Cl. .................. 242/199; 242/74; 81/3.05; 29/278

[58] Field of Search .................. 242/74, 197–199; 29/278, 280, 283; 81/3.05, 43

[56] References Cited

U.S. PATENT DOCUMENTS

| 209,989 | 11/1878 | Shinn | 81/3.05 |
|---|---|---|---|
| 1,656,000 | 1/1928 | Hubener | 29/278 |
| 3,019,521 | 3/1962 | Clark | 29/283 |
| 3,686,470 | 8/1972 | Stahlberg et al. | 242/74 |
| 3,980,255 | 9/1976 | Serizawa | 242/198 |

FOREIGN PATENT DOCUMENTS 2100959  5/1979  Fed. Rep. of Germany ............ 242/74

Primary Examiner—Leonard D. Christian
Attorney, Agent, or Firm—David R. Treacy

[57] ABSTRACT

A tape hub connection assembly, and a magnetic tape cassette containing such an assembly, in which an end of a length of tape is fixed to a reel hub by a clamping member pressed into a hub recess. The clamping member has a tool recess extending radially from the outer wall, for engagement by an assembly or an extraction tool so that the member is easily put in place or removed by a tool extending radially between the reel flanges.

10 Claims, 6 Drawing Figures

MAGNETIC TAPE CASSETTE

BACKGROUND OF THE INVENTION

The invention relates to a magnetic tape cassette which comprises first and second winding reels, which each comprise a winding hub with an essentially cylindrical outer wall in which a recess is formed, as well as a flange on each side of the winding hub. The first end of the magnetic tape contained in the cassette is attached to the first winding hub and the second end of said magnetic tape to the second winding hub, so as to enable the tape to be wound from the first winding reel to a second roll on the second winding reel and back from the second winding reel to a first roll on the first winding reel. First and second clamping members fix the first and the second end of the magnetic tape to the first and the second reel hubs respectively, by pressing the clamping members into the recesses in the winding hubs.

Magnetic tape cassettes having winding reels with flanges are employed for recording and reproducing video signals by means of so-called video recorders. In a known magnetic tape cassette for a video recorder, a so-called video cassette, the clamping member has a U-shaped cross-section with a wide crosspiece and short limbs, which limbs are formed with integral outwardly projecting feet which engage behind wall portions of the winding hub at the location of undercuts of the recess in the winding hub.

It is obvious that the mass manufacture of magnetic tape cassettes demands the use of machines for automatically attaching the magnetic tape to the winding hubs. However, it is desirable that magnetic tape can also simply be attached and detached by hand, so as to enable a fault during the manufacture to be corrected and a cassette to be repaired in the event of breakage of the tape.

From The German Auslegeschrift No. 2 100 959 published May 18, 1978 a device is known for fixing of a magnetic tape to a winding hub with the aid of a clamping member of the type mentioned above. This device serves for fitting clamping members in winding hubs without flanges. The winding hubs are arranged on a slide which is moved in the direction of an assembly station, the clamping members being conveyed to the station by the action of gravity and being temporarily retained by locally provided means. When the winding hub arrives at the mounting station one of the limbs of the U-shaped clamping member is pressed into a recess of the winding hub at a specific instant, after which the clamping member is tilted and is fitted into the recess by means of a pivotable mounting finger, which exerts pressure on the foot of the other limb. However, such a device cannot be used if flanges are situated on both sides of the winding hub, because these flanges prevent the winding hub from being conveyed to the assembly station. Mounting a clamping member in a winding hub with flanges on both sides is therefore far more difficult than mounting a clamping member in a winding hub without flanges. The aforementioned known magnetic tape cassette therefore has an opening in at least one of the flanges of the winding hub, namely at a location corresponding to the recess in the winding hub. Through the opening in the flange a clamping member can be inserted in a direction parallel to the axis of rotation of the winding reel until it faces the recess in the winding hub, after which the clamping member can be pressed into the winding hub in the radial direction with the aid of a tool, which is radially inserted between the flanges or which is passed through the opening in the flange and subsequently moved in the radial direction. The opening in the flange also serves for removing the clamping member. Through the opening a tool can be fitted behind the cross-piece of the U-member, after which the clamping member can be ejected in the radial direction.

The known magnetic tape cassette has some drawbacks. For example, for pressing the clamping member into the recess of the winding hub an intricate maneuver is required, as a result of which the movements of the clamping member, in particular during the press-in operation when the clamping member cannot be retained, are not fully controlled. For retaining and fitting the clamping member the automatic assembly tool should be provided with parts which are movable relative to each other. In the case of a magnetic video tape, which in certain cases has a thickness of only 15 $\mu$m or even less, a slight misalignment of the magnetic tape relative to the winding hub may already give rise to winding problems. Creases may be formed in the magnetic tape, which propagate outwards in the radial direction through many layers of the tape, so that at least a part of the roll is wound irregularly, which may lead to faults in the recording and reproduction of the signals. Also, at least one of the flanges should be formed with an opening. During manufacturing the opening in the flange should be aligned relative to the recess in the winding hub. The opening in the flange affects the appearance of the winding reel. A further drawback is that during removal of the clamping member, when a manual tool such as a screwdriver is used, and the clamping member can be removed in the radial direction, the clamping member may readily drop and may thus be lost.

SUMMARY OF THE INVENTION

It is the object of the invention to provide a magnetic tape cassette which does not have the aforementioned drawbacks.

According to the invention, in a cassette of the type described above, each of the clamping members, on a wall side which faces away from the axis of rotation of the relevant winding reel, comprises wall portions which form at least one assembly or tool recess, which enables the relevant clamping member to be fitted onto an assembly tool with which the member together with the magnetic tape can be pressed into the recess of the relevant winding hub in the radial direction between the reel flanges.

Especially for simplifying the removal of the clamping member, in a preferred embodiment of the invention form at least one undercut. The clamping members can then be extracted from the recess in the relevant winding hub in the radial direction between the reel flanges with the aid of a disassembly or extraction tool which fits behind a wall portion at the location of the tool recesses of each of the undercuts. Such an embodiment enables the clamping member to be removed in a simple and reliable manner, without requiring an opening in a flange of the winding reel and loss of the clamping member is readily avoided.

A further embodiment relates to a preferred design of the clamping member and the recess which allow simple mounting of the clamping member in the radial direction and correct fixing of the magnetic tape to the winding hub. Each of the recesses in the winding hubs takes the form of a slot which narrows from the cylindrical outer wall in the direction of the axis of rotation of the winding reel, which slot terminates in and communicates with a cylindrical opening of circular cross-section, which opening is disposed nearer the axis of rotation of the winding reel, and has a diameter greater than the width of the narrowest part of the slot. Each of the clamping members comprises a hollow tubular elastically deformable portion, having an outer diameter adapted to the dimensions of the cylindrical opening and to the thickness of the magnetic tape, and adjoining said tubular portion a wedge-shaped connecting portion which diverges away from the tubular portion, whose dimensions are adapted to the shape of the said slot in the winding hub, to the thickness of the magnetic tape, and to an outer portion having a wall side shaped as a continuation of the outer wall of the winding hub. Further, the clamping members are formed with an elongate assembly/disassembly slot or tool recesses in the wedge-shaped portion which slot terminates in the cavity of the tubular portion.

For automatic fixing of the magnetic tape to the winding reels with the aid of an assembly machine it is necessary that the recess in each winding hub is aligned relative to the assembly tool for mounting the clamping member. In this respect yet another embodiment of the invention is advantageous, which is characterized in that each of the winding hubs is formed with a locating recess, which has a predetermined position relative to the recess for the clamping member and which is adapted to co-operate with parts of a machine for automatically mounting the clamping members in the winding hub, so as to ensure that the winding hub is correctly aligned relative to an assembly tool for the clamping members. Winding hubs of winding reels of magnetic tape cassettes are practically always manufactured by injection molding from a suitable thermoplastic material. It is evident that a locating recess can readily be formed in the winding hub by providing a corresponding projection in the mold and that this does not lead to an increased cost.

The invention also relates to a manual disassembly tool for removing a clamping member from the winding hub of a magnetic tape cassette in accordance with the further embodiment described above, where the clamping member has an elongate assembly/disassembly slot. The disassembly tool in accordance with the invention is characterized in that it is provided with at least one hook, which comprises an elongate first portion which is connected to a handle, and a second portion which is perpendicular to said first portion, having a length which is smaller than that of the elongate slot in the wedge-shaped portion of the clamping member, and having a transverse dimension, which is smaller than the inner diameter of the tubular portion of a clamping member, so that these portions can be inserted into the tubular portion through the assembly/disassembly slot and can subsequently be moved in the axial direction of the tubular portion and thus be hooked behind parts of the clamping member, so that said member can be withdrawn from the recess in the winding hub by exerting a pulling force on the manual disassembly tool.

BRIEF DESCRIPTION OF THE DRAWINGS

The drawings show an embodiment of the invention which is described in more detail hereinafter. In the drawing.

BRIEF DESCRIPTION OF THE PREFERRED EMBODIMENT

Figure 1:
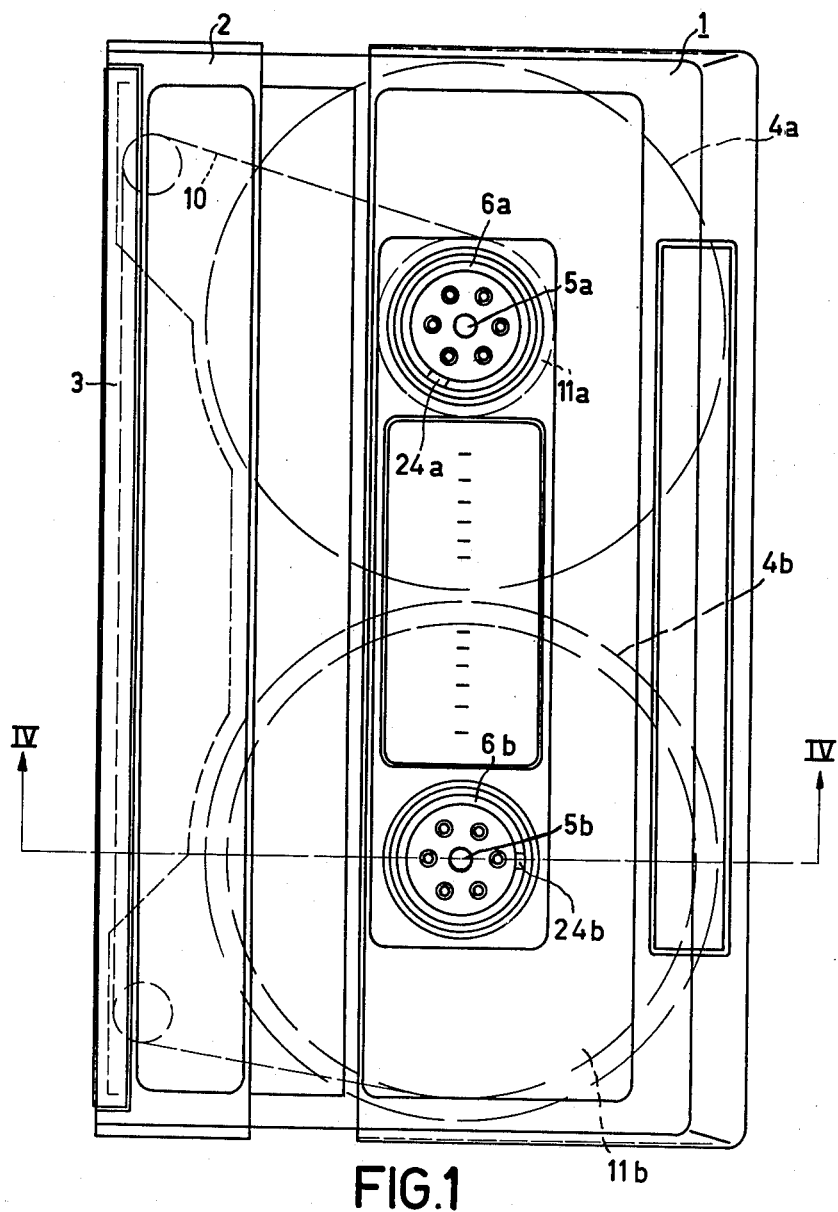
FIG. 1 is a plan view of a video cassette having a slot and a flap which is pivotable to two sides.
Figure 2:
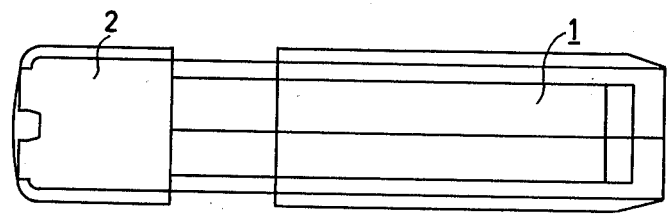
FIG. 2 is a side view of the video cassette of FIG. 1.
Figure 3:
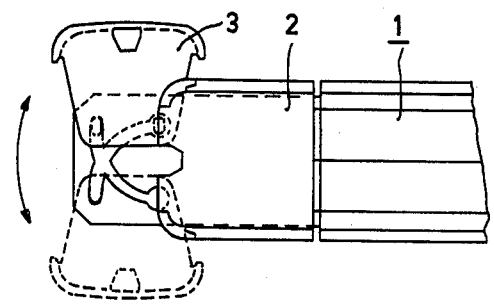
FIG. 3 shows a part of the side view of FIG. 2, but now with the slide withdrawn and with the flap in one of two open positions.
Figure 4:
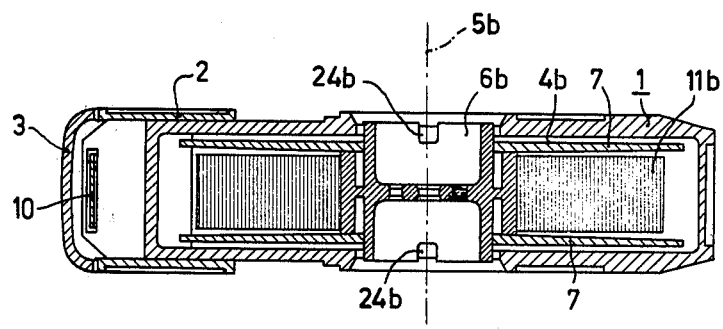
FIG. 4 is a cross-section of the video cassette in accordance with the arrows IV—IV in FIG. 1 at the location of one of the winding reels.

The video cassette of FIG. 1 comprises a plastic housing 1, on which a slide 2 is mounted so as to be movable and on which furthermore a flap 3 is mounted so as to be pivotable. The housing accommodates a first and a second winding reel 4a and 4b. These are rotatable about parallel axes of rotation 5a and 5b, respectively. The winding reels 4a and 4b comprise winding hubs 6a and 6b respectively, which are provided with a flange 7 on each side. As the two winding reels are fully identical, the suffixes "a" and "b" to the reference numerals merely serve to distinguish between the two winding reels in FIGS. 1 and 4. In the other figures such a distinction is not necessary.

The winding hubs 6 (for example see FIG. 5) comprise a cylindrical outer wall 8 with a recess 9. A magnetic tape 10 is attached to the first winding hub 5a at a first end and to the second winding hub 5b at a second end, so as to enable the tape to be wound from the first winding reel 4a to a second roll 11b on the second winding reel 4b and back from the second winding reel 4b to a first roll 11a on the first winding reel 4a. The ends of the magnetic tape are fixed to the winding hubs 6 by means of clamping members 12, see FIGS. 5 and 6. In order to clamp the magnetic tape in position it is positioned over the recess 9 of the winding hub 6 and is subsequently pressed into the recess 9 with the aid of the clamping member 12 and thus retained thereby.

On a wall side 13 which faces away from the axis of rotation 5 of the relevant winding reel 4, each of the clamping members 12 has an assembly/disassembly tool recess 14. This enables the clamping member to be pressed into the recess 9 of the winding hub 6 in the radial direction between the reel flanges 7 with the aid of an assembly tool, such as the manual assembly tool 15 (FIG. 5) to be described hereinafter.

The recess in the winding hub 6 takes the form of a slot 16 which narrows from the cylindrical outer wall of the winding hub as it extends in the direction of the axis of rotation 5, and which terminates in a cylindrical opening 17 nearer the axis of rotation, which opening has a circular cross-section with a diameter D which is greater than the width W of the narrowest part of the slot 16 as measured circumferentially about the axis of rotation. Each of the clamping members 12 comprises a hollow tubular elastically depressable portion 18 with an outer diameter adapted to the dimensions of the cylindrical opening 17 and to the thickness of the magnetic tape 10, and adjoining said portion a wedge-shaped portion 19 which diverges away from the tubular portion 18 and has dimensions adapted to the shape of the slot 16 in the winding hub 6, to the thickness of the magnetic tape 10, and to the outer wall 8 of the winding hub 6, and is formed with the assembly/disassembly recess 14, which has the form of an elongate slot and which terminates in the cavity 20 defined by the tubular portion 18. This slot serves to fit as well as to remove the clamping member, as will be explained hereinafter.

The length of the slot 14 in the axial direction is smaller than the height of the clamping member. As the slot 14 terminates in the through-going cavity 20 (see FIG. 5), undercuts are formed; behind these a disassembly tool (for example the manual disassembly tool 21 shown in FIG. 5) can be fitted. In this way the clamping member 12, whose height as shown in FIG. 6 is no greater than the distance between the flanges, can be extracted from the recess 9 of the winding hub 6 in the radial direction between the reel flanges 7.

Figure 5:
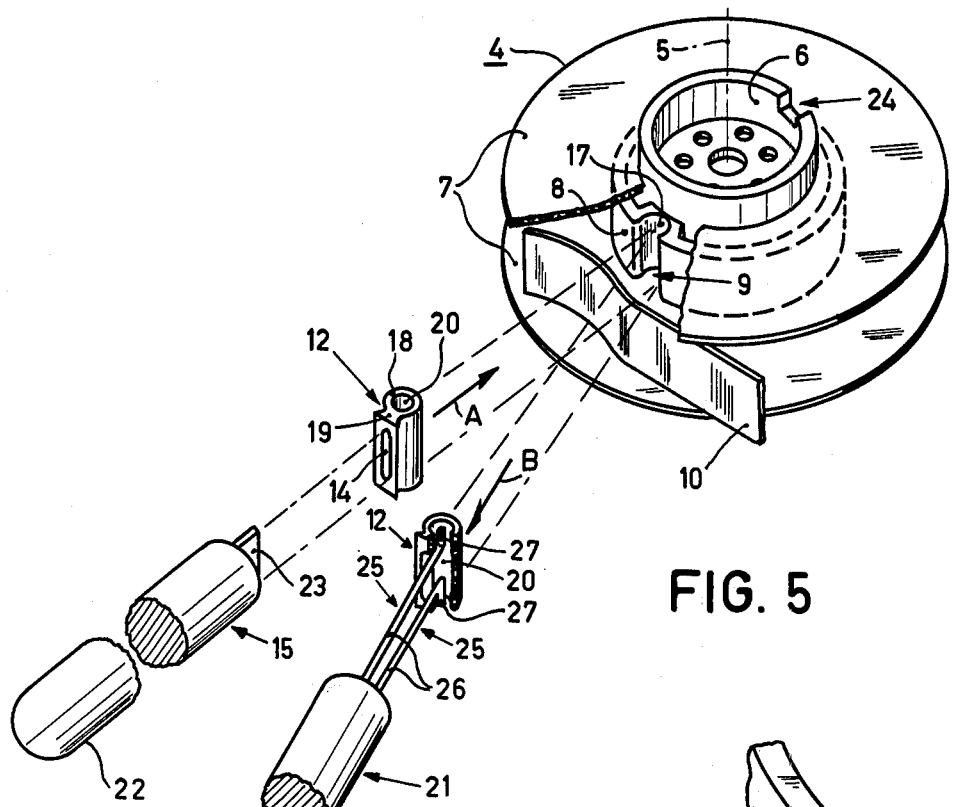
FIG. 5 is a partly cut-away elevation of the winding reel and also illustrates how a clamping member is mounted in or removed from the winding hub with the aid of a manual tool.
Figure 6:
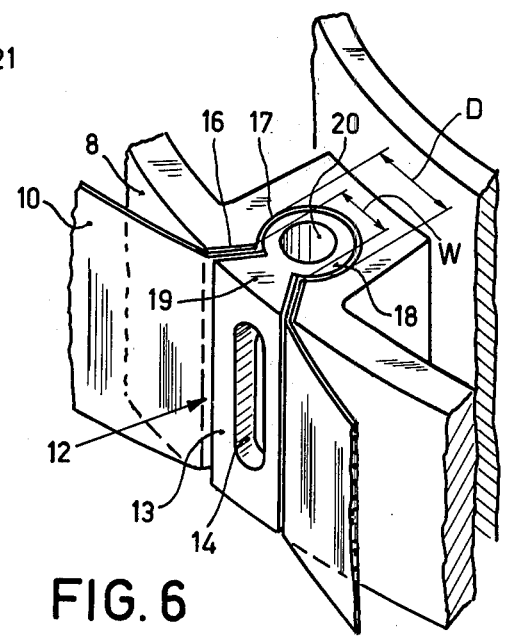
FIG. 6 is a perspective view of a detail of the winding reel of FIG. 5, the clamping member being fitted in the recess in the winding hub.

The manual assembly tool 15 shown in FIG. 5 comprises a handle 22, which at the front comprises an elongate strip-shaped insertion member 23, whose length and width dimensions are adapted to the dimensions of the slot 14 of the clamping member 12. The clamping member 12 is placed on the insertion member 23, on which it fits easily, and is subsequently passed in the direction of the arrow A between the flanges 7 of the winding reel 4. The magnetic tape 10 is positioned over the recess 9 and pressed into the recess 9 with the clamping member 12. For mass manufacture it is necessary to attach the magnetic tape 10 to the winding hub 6 by automatic means, for which of course use is made of a mechanically-actuated tool instead of the manual tool 15. For the automatic alignment of the position of the winding reel 4 relative to the mounting direction of the clamping member 12 the winding hub 6 is formed with a locating recess 24.

The manual disassembly tool 21, FIG. 5, for removing the clamping member 12 from the winding hub 6 comprises two hooks 25 of metal wire. These are fixed in a handle 26 and can readily be moved resiliently towards each other by hand. Each of said hooks comprises a reinforced first portion 26 and a second portion 27 which is perpendicular thereto. The length of this last-mentioned portion is smaller than half the length of the slot 14 of the clamping member 12. As the two portions 26 can be moved towards each other by hand, the portions 27 can be introduced into the central cavity 20 of the clamping member 12 through the slot 14. If subsequently the two portions 26 are released, they spring back into the position shown in FIG. 5, the portions 27 fitting behind the undercuts of the clamping member. In this position the clamping member can be removed in the direction of the arrow B between the flanges 7, without the clamping member being lost.

What is claimed is:

1. A tape hub connection assembly comprising:
    a winding hub having an axis of rotation defining an axial direction, a generally cylindrical outer wall adapted for winding a tape thereon, and a recess in said wall extending generally in said axial direction for receiving an end of a tape to be wound on the hub, and
    a deformable clamping member arranged to be pressed into said recess for fixing the end of a tape wound on the hub,
    characterized in that the clamping member has a wall side facing away from said axis of rotation, said wall side being generally cylindrical about said axis and having a tool recess extending toward said axis, said tool recess being adapted for insertion of an assembly tool therein, and
    the clamping member further comprises means permitting deformation of the member while an assembly tool is inserted in the tool recess so that the member can be pressed in a radial direction towards said axis into the hub recess.

2. An assembly as claimed in claim 1 wherein said tool recess in the wall side is formed with an undercut adapted for engagement by an extraction tool, said means permitting deformation being so arranged that, upon insertion of an extraction tool into the tool recess and engagement of the undercut, the member can be removed from the hub recess by pulling radially outward.

3. A tape hub connection assembly comprising:
    a winding hub having an axis of rotation defining an axial direction, a generally cylindrical outer wall adapted for winding a tape thereon, and a recess in said wall extending generally in said axial direction for receiving an end of a tape to be wound on the hub, and
    a deformable clamping member arranged to be pressed into said recess for fixing the end of a tape wound on the hub,
    characterized in that the clamping member comprises a hollow tubular portion defining a cavity extending in a direction generally parallel to said axis of rotation; an outer portion having a wall side facing from said axis of rotation; and a connecting portion between said hollow tubular and outer portions having a dimension circumferential to said axis of rotation less than a corresponding dimension of the tubular and outer portions; and
    said clamping member has a tool recess extending in a direction radial to said axis of rotation and communicating between said wall side and the cavity.

4. An assembly as claimed in claim 3 wherein the hub recess has a cylindrical opening having a circular cross-section, the axis of the cylindrical opening being parallel to said axis of rotation; and a slot extending from the hub outer wall to the cylindrical opening, the slot narrowing inwardly from the hub outer wall to a minimum width where it communicates with the cylindrical opening.

5. An assembly as claimed in claim 4 wherein said tool recess is elongated in the direction parallel to the axis of rotation.

6. An assembly as claimed in claim 3 wherein the hub has a locating recess at a predetermined position with respect to the hub recess.

7. A tape cassette comprising a housing, two winding reels disposed in the housing and rotatable about parallel axes of rotation, each reel having a winding hub and a flange at each end of the winding hub,
    each winding hub having an axis of rotation defining an axial direction, a generally cylindrical outer wall adapted for winding a tape thereon, and a recess in said wall extending generally in said axial direction for receiving an end of a tape to be wound on the hub, and a deformable clamping member arranged to be pressed into said recess for fixing the end of a tape wound on the hub, characterized in that the cassette housing and reels are arranged such that the clamping members are accessible only through a space between the reel flanges, each clamping member has a wall side facing away from said axis of rotation, characterized in that the clamping member has a wall side facing away from said axis of rotation, said wall side being generally cylindrical about said axis and having a tool recess extending toward said axis, said tool recess being adapted for insertion of an assembly tool therein, the clamping member further comprises means permitting deformation of the member while an assembly tool is inserted in the tool recess so that the member can be pressed in a radial direction towards said axis into the hub recess, and the clamping member has a length in the axial direction at least as small as the distance between the flanges of the respective reel, whereby the clamping members can be inserted and removed radially from between the reel flanges.

8. A cassette as claimed in claim 7 wherein said tool recess in the wall side is formed with an undercut adapted for engagement by an extraction tool, said means permitting deformation being so arranged that, upon insertion of an extraction tool into the tool recess and engagement of the undercut, the member can be removed from the hub recess by pulling radially outward.

9. A cassette as claimed in claim 7 wherein said means permitting deformation includes a hollow tubular portion defining a cavity extending in a direction generally parallel to said axis of rotation, said member further comprises an outer portion having a wall side facing from said axis of rotation; and a connecting portion between said hollow tubular and outer portions having a dimension circumferential to said axis of rotation less than a corresponding dimension of the tubular and outer portions; and the tool recess extends in a direction radial to said axis of rotation and communicates between said wall side and the cavity.

10. An extraction tool for manual disassembly of a clamping member in a cassette as claimed in claim 8, comprising:

a handle, an elongated first portion connected to the handle and having a free end, a second portion connected to the free end of said first portion, comprising two hooks extending in opposite directions transversely to the direction of elongation of the first portion, said hooks having a combined length in the transverse direction less than the length of said tool recess in the axial direction, said hooks having a width less than the width of said tool recess, at least one of said first and second portions including resilient means allowing movement of said hooks toward each other such that they can be passed into the tool recess, and such that said hooks will resiliently separate from each other so as to engage said undercuts to permit extraction of the clamping member by exerting a pulling force radially outward at the handle.

* * * * *